United States Patent Office 3,309,156
Patented Mar. 14, 1967

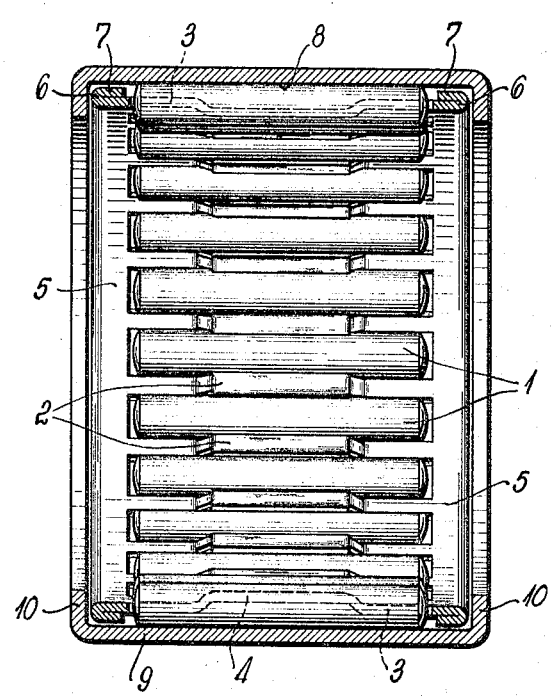

3,309,156
THIN-WALLED CAGE FOR CYLINDRICAL ROLLERS
Karl-Albert Eckstein, Herzogenaurach, near Nurnberg, Germany, assignor to Industriewerk Schaeffler, Herzogenaurach, Germany, a corporation of Germany
Filed Aug. 3, 1964, Ser. No. 387,128
Claims priority, application Germany, Aug. 13, 1963, J 24,238
2 Claims. (Cl. 308—217)

The invention relates to a novel thin-walled cage for cylindrical roller elements having an adequate guiding surface for the cage.

Cages for cylindrical roller elements made of thin-walled material such as sheet metal, wherein the apertures to accommodate the rollers are bounded by cross-bars which guide and/or retain the rollers and the said cross-bars are connected at both axial ends by end rings are well-known. It is also known that roller cages have to be guided concentrically with respect to the roller raceways.

In certain cases it is possible to guide the cage on the rollers themselves, but this solution is not generally satisfactory since it causes a high degree of wear on the cage cross-bars. Therefore, attempts are usually made to guide the cage concentrically on the roller raceways themselves, but this is difficult in the case of thin-walled cages. Sheet metal cages provided at their ends with radially outwardly-directed rims are known and it is possible per se in such a cage to use the outer surfaces of the rims for guiding the cage on the outer roller raceway. However, with thin-walled sheet metal cages, this outer surface of the cage rims is so narrow that considerable wear would be caused if the rims were used in this way. Moreover, thin-walled cages have in many cases the disadvantage that the cages do not have the desired rigidity due to the thin cross-section of the material.

It is an object of the invention to provide thin-walled cages for cylindrical roller elements having adequate surfaces for guiding the cage concentrically on the roller raceway.

It is another object of the invention to provide thin-walled cages for cylindrical roller elements which have improved rigidity.

These and other objects and advantages of the invention will become obvious from the following detailed description.

The novel thin-walled cage of the invention for cylindrical rollers is comprised of apertures for accommodating cylindrical rollers bounded by cross-bars connected at both axial ends by end rings, the end rings at both axial ends of the cage being provided with radially outwardly-directed rims which merge into flanges directed axially towards one another. The said flanges may be made wide enough so that the outer diameter of the flanges is adapted to the diameter of the outer raceway for the rollers and an adequately large guiding surface for the cage is obtained. In addition, this construction of a thin-walled cage provides additional stiffening to the cage which is a substantial improvement over known cages.

A preferred cage embodiment is that in which the thickness of the cage material is so adapted to the roller diameter that the radially outwardly-directed rims are low enough in height that the flanges directed towards one another bear directly on the end rings. Such a cage does not require special care to ensure that a specific spacing is maintained between the cage end rings and the flanges directed axially toward one another. By simply folding over the cage end rings, this region is given twice the wall thickness of the cage material used, thus obtaining the correct diameter for the cage guiding surfaces in a simple way.

It is known that in many cases thin-walled cages are used in race rings shaped from sheet metal without cutting and have at both ends radially inwardly-directed rims which are formed without cutting. When such race rings are being produced, it is unavoidable that some rounding will be produced at the transition point between the radially-directed rims and the roller raceway. In this case, care should be taken that the cage is also rounded at the appropriate region. Therefore, the transition point between the radially-directed rims and the axially-directed flanges of the cage is provided with an external rounding having a radius equal to or greater than the radius between the raceway and the formed-on rims of the outer race ring.

Referring now to the drawing:

FIG. 1 is a longitudinal sectional view of one cage embodiment of the invention.

In the embodiment of FIG. 1, the rollers 1 are arraned in apertures in a cage bounded with the peripheral direction by cross-bars 2 which are connected at their ends by end rings 5. The cross-bars 2 are so constructed that the end portions 3 are disposed approximately at the center of the rollers while the center portions 4 are offset inwardly and as shown in the figure widen relative to the end portions 3 so that they prevent the rollers 1 from falling inwardly out of position. The axially parallel guidance of the rollers is effected by portions 3.

The end rings 5 are provided with radially outwardly-directed rims 6 which themselves merge into flanges 7 disposed axially towards one another. The outer diameter of the flanges 7 is chosen so that the cage is guided thereon in the outer raceway 8 for the rollers 1. The cage is arranged in a race ring 9 provided at both ends with rims 10 which extend radially inwards. Since the manufacturing process produces rounded portions at the transitions between the rims 10 and the cylindrical ring 9, it is arranged that an external rounding shall also be provided at the transitions between the rims 6 and the flanges 7 of the cage.

Various modifications of the cage of the invention may be made without departing from the spirit or scope thereof and it is to be understood that the invention is to be limited only as defined in the appended claims.

I claim:

1. A thin-walled cage for cylindrical rollers accommodated in an outer race comprising apertures for accommodating cylindrical rollers bounded by cross-bars connected at both axial ends by end rings, the end rings being provided with radially outwardly-directed rims which merge into flanges directed axially towards one another, and the said radially outwardly-directed rims having a low enough height that the said flanges bear directly against the end rings and guiding the cage concentrically on the roller raceway of said outer race by said flanges.

2. A thin-walled cage accommodated in a race produced without cutting and provided at both ends with rims formed on without cutting comprising apertures for accommodating cylindrical rollers bounded by cross-bars connected at both axial ends by end rings provided with radially outwardly-directed rims which merge into flanges directed axially towards one another, the transition point between the said outwardly-directed rims and flanges having an external rounding with a radius at least equal to the radius between the raceway and the formed-on rims of the outer race.

References Cited by the Examiner
UNITED STATES PATENTS

| | | | |
|---|---|---|---|
| 2,120,154 | 6/1938 | Schildgen et al. | 308—201 |
| 2,651,552 | 9/1953 | Pitner | 308—217 |
| 2,894,791 | 7/1959 | White et al. | 308—212 |

MARTIN P. SCHWADRON, *Primary Examiner.*
FRANK SUSKO, *Examiner.*